Oct. 12, 1948.
C. R. SACCHINI
2,451,449
SHAFT ACTUATED SNAP ACTION MECHANISM FOR
RECIPROCATING EXPANSIBLE CHAMBER MOTORS
Filed Oct. 23, 1945
5 Sheets-Sheet 1
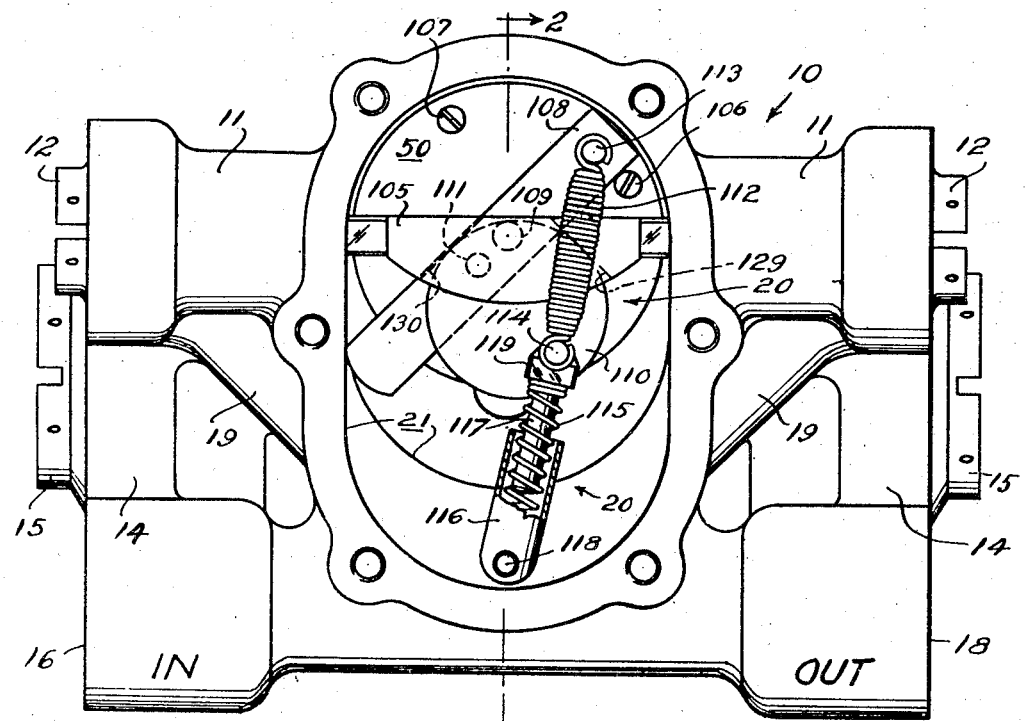
FIG-1
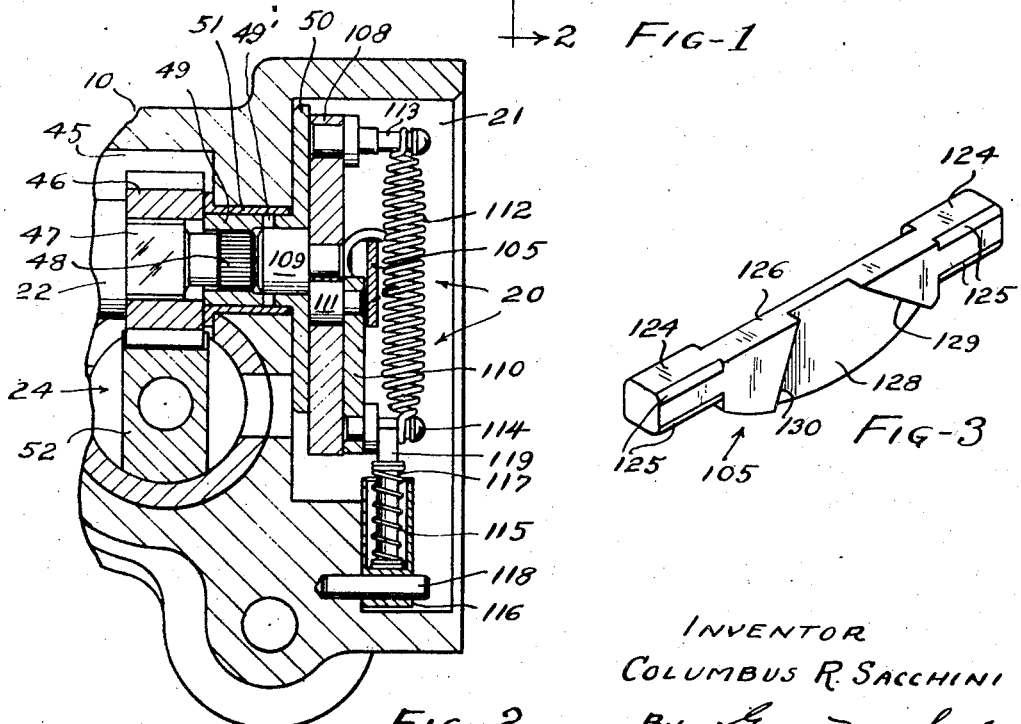
FIG-2
FIG-3
INVENTOR
COLUMBUS R. SACCHINI
BY George M. Soule
ATTORNEY Oct. 12, 1948.  C. R. SACCHINI  2,451,449
SHAFT ACTUATED SNAP ACTION MECHANISM FOR
RECIPROCATING EXPANSIBLE CHAMBER MOTORS
Filed Oct. 23, 1945  5 Sheets-Sheet 2

INVENTOR
COLUMBUS R. SACCHINI
BY George M. Soule
ATTORNEY

Inventor
Columbus R. Sacchini
By George M. Souk
Attorney

INVENTOR
COLUMBUS R. SACCHINI
BY George M Soule
ATTORNEY

Oct. 12, 1948.   C. R. SACCHINI   2,451,449
SHAFT ACTUATED SNAP ACTION MECHANISM FOR
RECIPROCATING EXPANSIBLE CHAMBER MOTORS
Filed Oct. 23, 1945   5 Sheets-Sheet 5

INVENTOR.
COLUMBUS R. SACCHINI
BY
George M Souk
ATTORNEY

Patented Oct. 12, 1948

2,451,449

UNITED STATES PATENT OFFICE 2,451,449

SHAFT ACTUATED SNAP ACTION MECHANISM FOR RECIPROCATING EXPANSIBLE CHAMBER MOTORS

Columbus R. Sacchini, Willoughby, Ohio, assignor to The Marquette Metal Products Company, Cleveland, Ohio, a corporation of Ohio Application October 23, 1945, Serial No. 624,072

16 Claims. (Cl. 121—164)

This invention relates to fluid operated motors and more particularly to a fluid operated motor of the reciprocating type which is useable, for example, as the prime mover of a window or windshield wiping mechanism.

In the present motor the torque output is large in relation to the size and weight of the motor and the efficiency is high so that fluid consumption is very low. The motor is capable of operating positively and efficiently for long periods both when supplied with operating fluid under relatively low pressure and when supplied with fluid under extremely high pressure. Although hydraulic fluid is contemplated as the operating medium, the motor may be driven by air or other gaseous fluid.

In the copending patent application of John H. Galley and Leroy J. Carey, Serial No. 548,692, filed August 9, 1944, there is described a fluid motor of the same general type as that described herein, and the present motor possesses all of the advantages of the said prior motor. In addition, the present motor has an improved and simplified snap action mechanism for operating the valves. The housing or body of the present motor is so arranged that the fluid passages are more simply formed and require no sealing plugs. Modifications are described in which the power-take-off shaft is driven more slowly than the shaft operating the snap action mechanism so that extremely short stroke operation of a wiper blade directly driven by the power take-off shaft is possible. Other improved features will be discussed in the description of the illustrated forms.

An object of the present invention is to provide a new and/or improved fluid motor.

Another object is to provide an improved valve mechanism for a fluid motor.

A correlative object is to provide an improved reversing or snap action toggle mechanism for operating a fluid control valve means.

A further object is to provide a fluid motor having a power take-off shaft driven with alternate rotary motion and in which the angle of movement of the shaft between reversals can be made extremely small.

Still another object is to provide a housing for a fluid motor including a plurality of fluid passages leading to and from valve and piston chambers and which may be readily drilled but none of which passages require the use of plugs for closing off end portions.

An additional object is to provide a composite closure member for a recess containing a snap action mechanism and having a wear resisting portion against which a moving part of the snap action mechanism is apt to slide.

Other objects and advantages will become apparent from the following description wherein reference is made to the drawings in which:

Fig. 1 is a rear end view of the motor with the cover removed showing the snap action toggle mechanism;

Fig. 2 is a fragmentary sectional view taken generally as indicated by the line 2—2 of Fig. 1;

Fig. 3 is a perspective view of a push rod for operating the valves;

Figure 4:
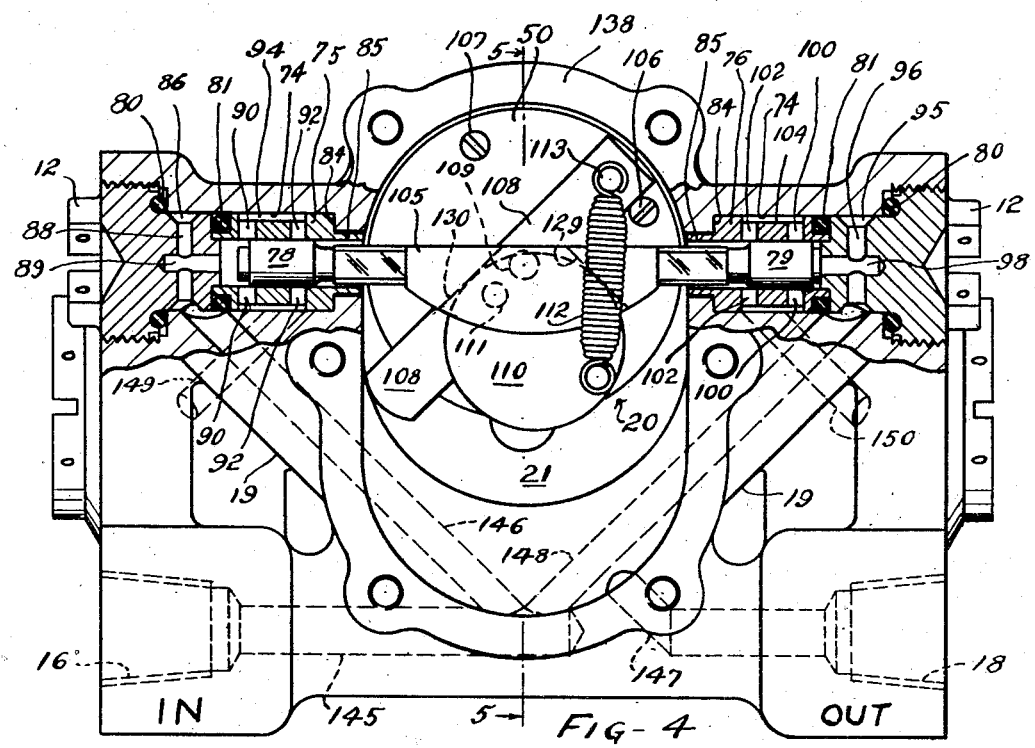
Fig. 4 is a view similar to Fig. 1 but showing the valve mechanism in section, as indicated by the line 4—4 of Fig. 5, and the fluid passages and in which the booster spring for the snap action toggle mechanism has been omitted.
Figure 8:
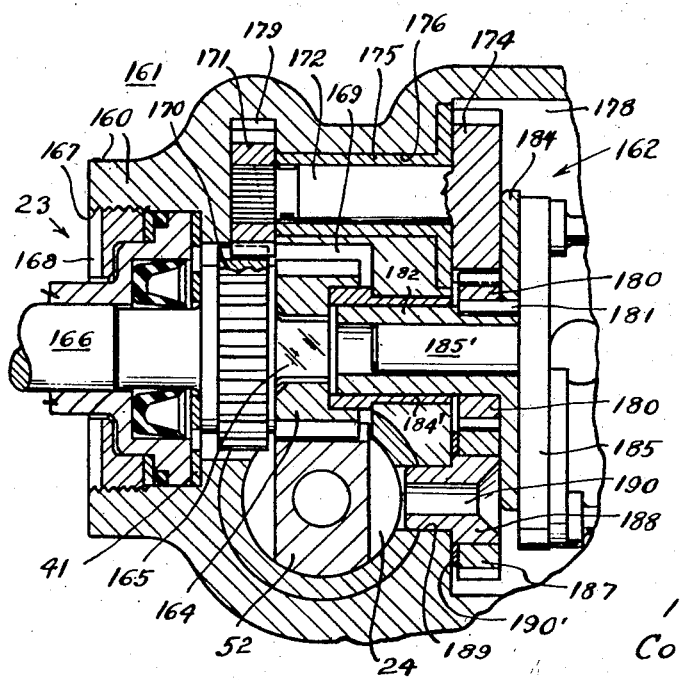
Figure 7:
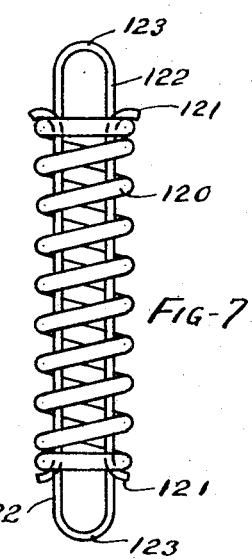
Figure 5:
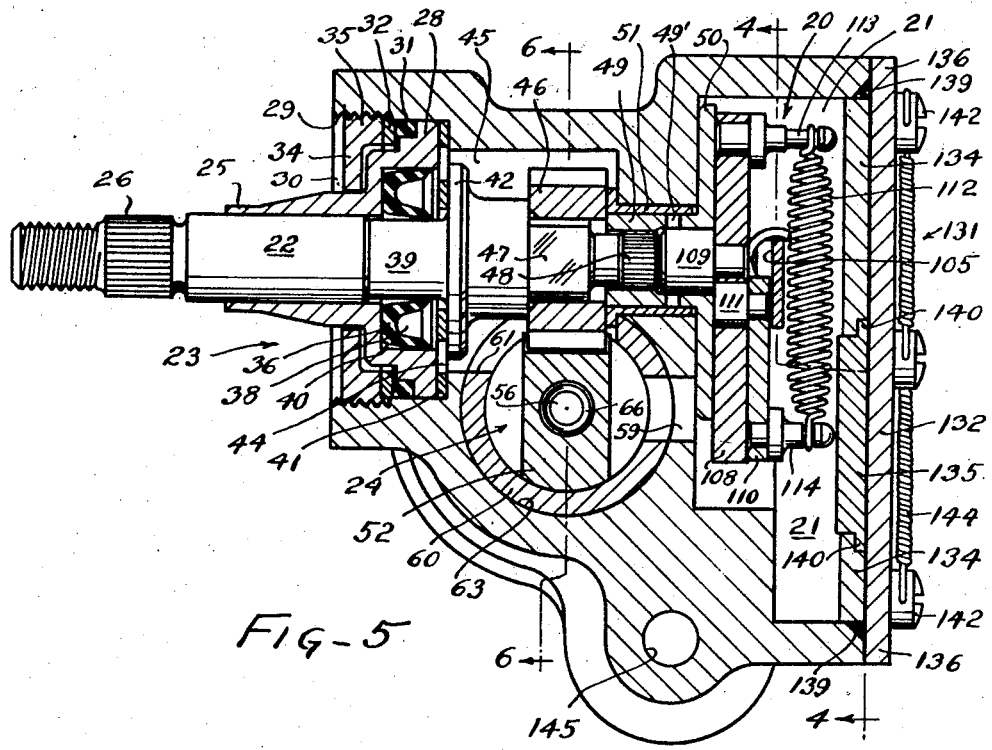
Figure 6:
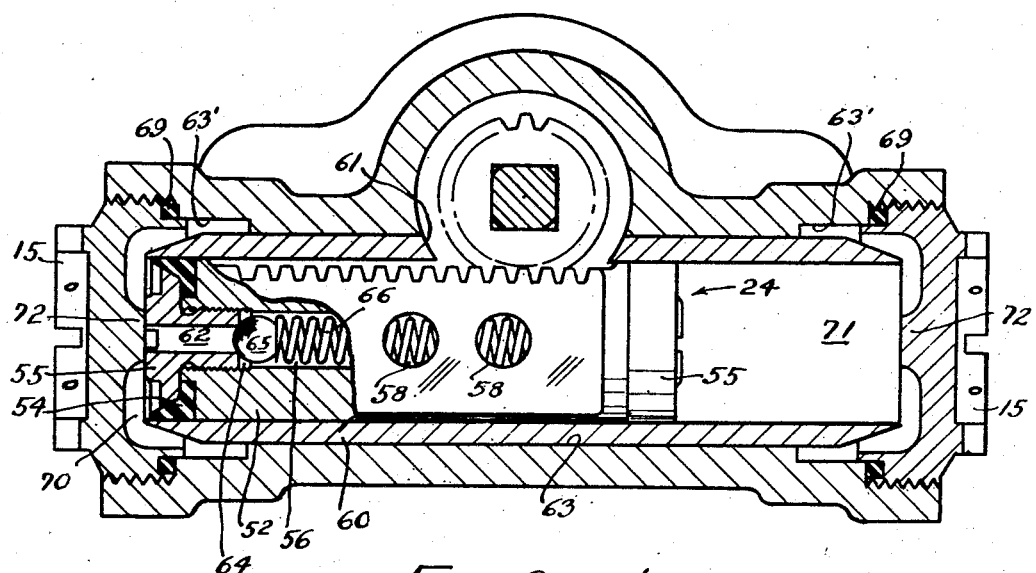
Figure 10:
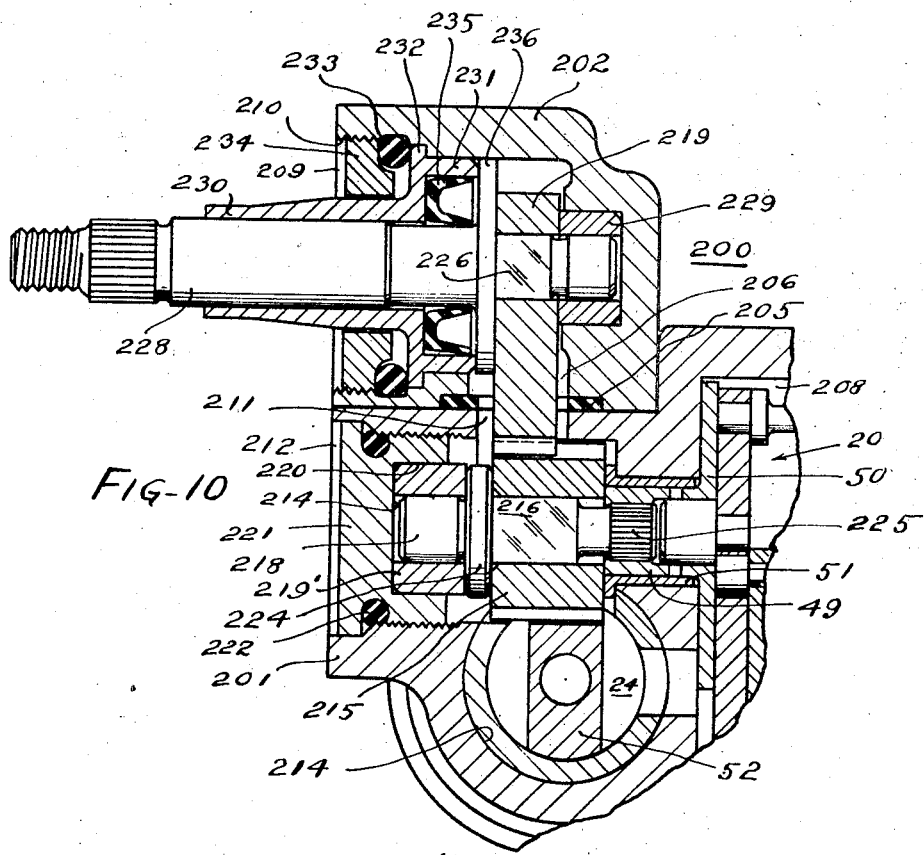
Figure 9:
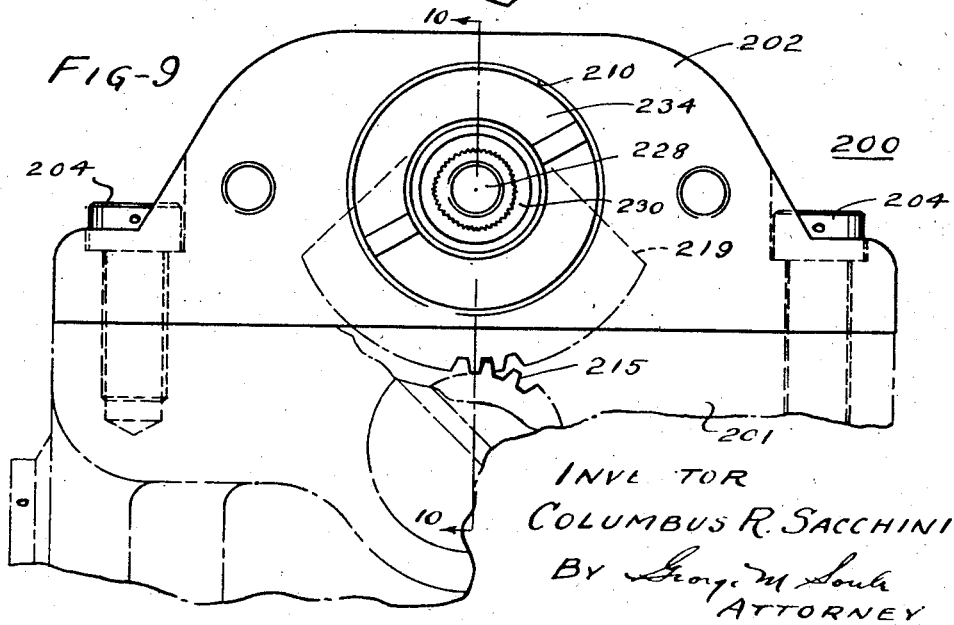

Figs. 5 and 6 are sectional views taken generally as indicated by the lines 5—5 and 6—6, respectively, of Figs. 4 and 5, respectively;

Fig. 7 is a detail view of a modified spring for the toggle mechanism;

Fig. 8 is a fragmentary sectionalized view of a modified motor;

Fig. 9 is a fragmentary partly diagrammatic front end view of a further modification;

Fig. 10 is a fragmentary sectional view taken generally along the line 10—10 of Fig. 9; and Figs. 11 to 14 are diagrammatic views showing the operation of the snap action toggle mechanism.

The motor operates properly in any turned position, hence such terms as front and rear, left and right, are not to be considered restrictive in any sense.

Considering the embodiment of Figs. 1 to 6, and referring particularly to Fig. 1, a housing for the motor comprises a body member 10 which is preferably formed of a light, non-ferrous metal or a suitable plastic, appropriately bored to accommodate the working parts, and irregularly shaped to provide a minimum of wall thickness throughout. A hollow, valve-mechanism-containing portion 11 of the body 10 is closed at its opposite ends by respective castellated plugs 12 constituting a part of the valve mechanism (Fig. 4), and a hollow, piston containing body portion 14 is closed at its opposite ends by respective castellated plugs 15. Operating fluid which enters the motor under high pressure at a port 16 (marked "in") flows to the valve mechanism alternately through passages (to be described) formed within respective upwardly diverging body portions 19 and is later discharged at a port 18 (marked "out").

A snap action mechanism 20 (Figs. 1, 2, 4 and 5) disposed within a recess 21 formed in a side wall of the body 10 is driven by a power take-off shaft 22 (Figs. 2 and 5) and operates the valve mechanism which is arranged to control the reciprocation of a piston assembly 24 (Figs. 2, 5, and 6) and which in turn drives the shaft 22.

The shaft 22 is rotatably supported in a bearing assembly 23 comprising a bushing 25 (Fig. 5) and may have a longitudinally serrated outer end portion 26 for receiving a windshield wiper drive arm (not shown) which may be held in position by a suitable nut (not shown) threaded on the shaft. The bushing 25 has an inner flange portion 28 slidably received in a counterbore 29 of a circular opening 30 in the body 10 and is provided with a pair of axially spaced, annular shouldered portions seating, respectively an elastic packing ring 31 and a washer 32. The outer marginal portion of the washer 32 engages the ring 31 with adjustable pressure provided by a collar 34 threaded into the counterbore 29 and having an inturned flange portion 35 bearing against the washer 32.

A packing ring 36 having a C-shaped cross section with inner and outer annular wall portions defining a channel 38 is compressed between a reduced portion 39 of the shaft 22 and the side wall of a counterbore 40 formed at the inner end portion of the bushing 25. As shown, the channel 38 opens inwardly toward an annular retainer 41 having its outer marginal portion disposed between the flange 28 and the bottom of the counterbore 29 and having its inner marginal portion bearing against a flange 42 formed on the shaft 22. The retainer 41 has a plurality of circumferentially spaced fluid conducting openings 44 for fully exposing the inner face of the packing ring to fluid within the housing.

An intermediate portion of the opening 30 defines a working space 45 for a pinion 46 which is mounted on a noncircular (e. g. squared) portion 47 of the shaft 22. A longitudinally serrated inner end portion 48 of the shaft 22 is received in adjusted turned position within a complementary grooved bore of a hub portion 49 of a drive plate 50 constituting a portion of the snap action mechanism 20. The hub 49 is rotatably supported by a flanged bushing 51 pressed into a reduced extension of the opening 30, suitable ports 49' being provided in the hub to permit the operating fluid of the motor to lubricate the bushing 51. Axial movement of the shaft 22 outwardly of the body 10 is prevented by abutment of the flange 42 against the retainer 41 and inwardly by abutment of the pinion 46 against the flange portion of the bushing 51.

The pinion 46 is in constant mesh with the teeth of a rack member 52 forming part of the piston assembly 24 (Figs. 2, 5 and 6) which is similar to that disclosed and claimed in the above mentioned application. The piston assembly also comprises a pair of flexible sealing cups 54 (Fig. 6) held in position by suitable piston heads 55 threaded into respective opposite ends of an axial bore 56 through the rack member 52. A plurality of axially spaced, transverse bores 58 through the rack member 52 intersect the bore 56 and are open to a region at atmospheric pressure (outlet 59, Fig. 5 described later). The piston assembly 24 is slidably received for reciprocation within a sleeve 60 of bronze or other "bearing" alloy pressed into a transverse cylinder bore 63 in the body portion 14 and intersecting the working space 45, the sleeve being provided with an opening 61 through which the pinion 46 extends to engage the teeth of the rack member 52.

The piston heads 55 have central bores 62, respectively, which are aligned with the bore 56 and the inner end portions of which define respective spherically contoured valve seats 64 complementary to a pair of safety relief ball valves 65 normally held in seated position thereon by a helical compression spring 66 interposed between the balls. The rack member 24, intermediate of its end portions, is of generally rectangular cross section having a toothed upper surface but having a curved lower surface and cylindrical end portions complementary to the inner wall of the piston sleeve 60 as shown in Figs. 5 and 6. The castellated plugs 15 which seal the bore 63 have internal recesses and are threaded respectively into counterbores 63' formed at opposite ends of the bore, suitable annular packings 69 being received within shouldered recesses on the plugs and compressed against the bottoms of the respective counterbores. Piston chambers 70 and 71 are thereby formed at opposite ends of the piston assembly 24. Central bosses 72 in the internal recesses of the plugs 15 serve as overtraveling stops for the piston assembly 24 when the motor mechanism is adjusted for maximum stroke operation.

Referring to Fig. 4, a pair of coaxial valve bores 74 within the body portion 11 and opening into the recess 21 respectively receive a pair of valve guides in the form of sleeves 75 and 76. The valve assembly additionally comprises a pair of preferably similar valve plungers 78 and 79 slidably received for reciprocation in the sleeves 75 and 76, respectively. The valve plungers are in a sense free-floating although caused to move simultaneously in the same direction as though interconnected. The outer end portions of the bores 74 are counterbored and threaded to receive, respectively, the castellated plugs 12, reduced inner end portions of which are piloted within the respective valve sleeves 75 and 76 to assist in holding the sleeves in coaxial relationship and centered in the respective bore portions which receive the sleeves.

Elastic ring packings 80 are received in grooves formed in the inner transverse face surfaces of shouldered portions of the plugs 12, respectively, and are compressed against the bottoms of the counterbored portions of the respective bores 74, and similar packings 81 are received in annular shouldered recesses formed at the outer end portions of the valve guides 75 and 76 and are compressed against the inner face surfaces of the plugs 12, respectively. Reduced inner end portions of the bores 74 define annular shoulders 84 against which the inner end faces of the guides 75 and 76 bear respectively. Tubular extensions 85 on the guides 75 and 76 fit loosely within the reduced bore portions, respectively.

The machining dimensions between the plugs 12 and the respective valve sleeves 75 and 76 are such that before metal to metal contact therebetween occurs the packings 81 are squeezed out or extended against the walls of the respective bores 74, and the packings 80 are made thick enough so that they are compressed a considerable amount at the same time that the packings 81 are compressed. Thus by merely screwing the plugs 12 into position, the sleeves 75 and 76 are properly positioned and the bores 74 sealed against fluid leakage.

An annular chamber 86 defined by a tapered circumferential groove in the left hand plug 12 communicates with the interior of the valve sleeve 75 through radial passages 88 and an axial passage 89 in the plug. A pair of diametrically opposed ports 90 and a similar pair of ports 92 permit fluid to flow between the interior of the sleeve 75 and an annular chamber 94 defined by an intermediate reduced portion of the sleeve. Similarly, an annular chamber 95 defined by a tapered circumferential groove in the right hand plug 12 communicates with the interior of the sleeve 76 through radial passages 96 and an axial passage 98 in the plug; and ports 100, 102, which correspond to the ports 90 and 92, respectively, permit fluid to flow between the interior of the sleeve 76 and a chamber 104 defined by an intermediate reduced portion of the sleeve. The valve plungers 78 and 79 have respective inner end portions of reduced diameter adapted to cooperate with a valve actuating push rod 105 of the snap action mechanism 20 described below.

Drive pins 106 and 107 (Figs. 1 and 4) of the snap action mechanism 20 are threaded into respective circumferentially spaced sockets formed in the outer marginal portion of the drive plate 50. If desired, additional sockets may be provided in the manner described in the above mentioned application thereby to permit adjustable positioning of the drive pins 106 and 107. Rotary movement of the shaft 22 causes turning of the plate 50 so that one or the other of the drive pins 106 and 107 strikes a toggle arm 108 which has fixed thereto a stub shaft 109 (Figs. 2 and 5) rotatably received in a smooth portion of the central bore of the hub 49 as a pivot for the toggle arm.

The drive plate 50, if its hub portion 49 is removed from the serrated end 48 of the shaft 22 and replaced in a different turned position on the serrations of the shaft, will cause the wiper blade drive arm (not shown) to operate over a field centered at one side of the unit (e. g. reference plane of the line 2—2 of Fig. 1). Similar adjustment of the drive arm on the serrated portion 26 likewise changes the field of wiping operation.

The snap action mechanism 20 (cf. Figs. 1 and 4) further includes a toggle or cam member 110 in the form of a circular disc which is pivoted at its upper marginal portion on a pin 111 extending rearwardly from approximately the longitudinal center of the arm 108. The arm 108 and the cam 110 are held normally in the right hand position shown by solid lines in Figs. 1 and 4 (or in a similar left hand position) due to the bias of a helical tension spring 112 suitably secured at its opposite ends to pins 113 and 114 respectively. The pins 113 and 114 have shank portions received respectively in complementary sockets formed respectively at the upper end portion of the arm 108 and the lower marginal portion of the cam 110. The snap action mechanism 20 may also have a helper spring or spring assembly including, as shown in Figs. 1 and 2, a compression spring 115. The lower end portion of the spring 115 is received within a spring guide or socket 116 and the upper end portion surrounds a cylindrical inner spring guide 117 which freely telescopes into the guide 116. The lower end of the spring 115 bears against the bottom of the guide 116 which is pivoted to the body 10 as by a pin 118. The upper end of the spring 115 bears against a crotch portion 119 of the guide 117. A semi-circular groove in the upper face of the crotch 119 bears against and is retained in position by the lower curved face of the pin 114 so that the guide 117 may rotate relative to the pin.

Tension springs as ordinarily made are apt to break at the attaching loops in strenuous service and, to avoid such breakage, a compression spring 120 (Fig. 7) may be substituted for the tension spring 112. The spring 120 has its opposite ends received in outwardly turned end portions 121, respectively, of opposing and overlapping U-shaped tension members 122 adapted to have their bight portions 123 rotatably received on the respective pins 113 and 114.

The push rod 105 (Figs. 1, 3 and 5) extends longitudinally across the recess 21 and has generally square opposite end portions 124 provided with rounded corners 125 serving as bearing lands in the valve sleeves and an enlarged intermediate portion 126 having a groove 128 in its rear face. The groove 128 has upwardly converging or oblique side walls defining camming surfaces 129 and 130 which cooperate with circular surfaces of the cam 110 as described hereinafter. Continuously open ports are provided by the flat faces of the generally square end portions of the push rod 105 for exhaust of operating fluid axially from the valve sleeves 75 and 76.

A composite, readily removable cover plate for the recess 21 (see Fig. 5) comprises an outer plate member 132 and separate inner plate members 134 and 135, the latter serving as a wear plate against which the rounded free end of the spring supporting pin 114 may slide and prevent the circular cam 110 of the toggle mechanism from being pulled or forced out of parallelism with the drive plate by the snap action spring or springs. The sliding abutment between wear plate and pin 114 also prevents the rearward face of the circular cam from bearing on the recessed forward face of the push rod 105 in a manner to interfere with free movement of the push rod. The pin 114 is rigid with the circular cam, but the cam pivot on the small end of the pin 111 enables free rotary movement of the cam on the pin and movement of the cam axially of the pin for easy assembly and disassembly.

The plate members 132 and 134 may be secured together by spot welding so as to provide a continuously projecting attaching flange portion 136 for the cover plate assembly. The flange 136 overlies the flat rear face 138 of the body 10 adjacent the recess 21 and compresses a suitable packing ring 139 within a chamfered recess at the inner peripheral margin of the flat face 138. The wear plate 135 is retained in place by a perimetral flange 140 of the wear plate seated in a stepped portion of an opening in the inner plate member 134 filled by the wear plate. The wear plate 135, or at least its smooth exposed surface, is of suitable wear and corrosion resisting metal.

As shown best in Fig. 4, the fluid inlet port 16 communicates with a horizontal passage 145 from the inner end portion of which upwardly diverging or obliquely extending passages 146 and 148 within the body portions 19 lead to respective outer end portions of the valve bores 74. An inclined passage 149 extending from the chamber 94 of the valve assembly to the left hand counterbore 63' (Fig. 6) of the piston bore 63 provides for fluid flow from the left hand valve assembly to and from the piston chamber 70 and a similar passage 150 extending from the chamber 104, to the right hand counterbore 63' (Fig. 6) of the piston bore 63 provides for fluid flow from the left hand valve assembly to and from the piston chamber 70 and a similar passage 150 extending from the chamber 94 to the right hand counterbore 63' (Fig. 6) provides for fluid flow to and from the piston chamber 71. It should be noted that the main fluid inlet and distributing passages 145, 146, 148, 149 and 150 are so arranged that drilling thereof is readily accomplished through the respective openings for the castellated plugs 12 of the valve assemblies and the plugs 15 of the piston and cylinder assemblies, wherefore no sealing plugs are required in forming said main fluid passages.

In event either of the safety relief ball valves 65 (Fig. 6) is unseated, as by extremely high pressure in one or the other or both of the piston chamber 70 and 71, fluid flows into the axial bore 56 of the rack member 52 and out of the transverse bores 58 to the outlet 59, Fig. 5, in the inner wall of the recess 21 whereby such excess internal pressure is relieved. A safety valve means is thus provided which, in the event extremely high pressure fluid is supplied to the motor, prevents damage being done to the motor or the apparatus driven thereby. Discharge fluid received in the recess 21 through the outlets 59 as well as from the interior of the valve sleeves 75 and 76 flows freely therefrom through a short bottom drain passage 147 (Fig. 4) to the outlet port 18.

In considering the operation of the motor, the moving parts are assumed to be initially in the position shown by solid lines in Figs. 1, 4 and 6 and reference will be made to the diagrams of Figs. 11 to 14.

Operating fluid supplied in a suitable manner to the inlet port 16 flows through the passages 145 and 146 (Fig. 4), the annular chamber 86, the passages 88 and 89, the interior of the valve sleeve 75 at the left of the plunger 78, through the ports 90, the chamber 94, and the passage 149 to the piston chamber 70. Concurrently, fluid enters the passage 148 and flows through the annular chamber 95 and the passages 96 and 98 against the right end face of the valve plunger 79 where it becomes static since the plunger 79 is held in the position shown by the push rod 105 and the toggle mechanism 20.

The high pressure fluid in the piston chamber 70 forces the rack member 52 to the right from the position shown in Fig. 6, and the rack teeth drive the pinion 46 counterclockwise (Fig. 6) to effect turning movement of the shaft 22. Rotation of the shaft 22 counterclockwise rotates the index or drive plate 50 counterclockwise as shown in Figs. 1 and 4 to cause the drive pin 106 to rotate the toggle arm 108 counterclockwise from the position shown by the solid lines against the bias of the springs 112 and 115.

Figure 11:
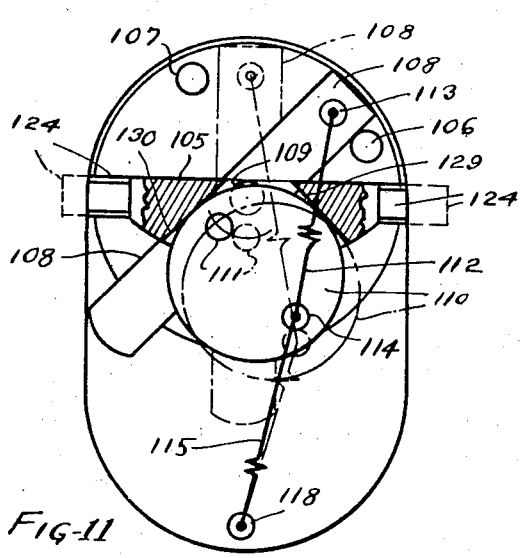

Referring to Fig. 11, it will be noted that as the toggle arm 108 is moved by the pin 106 from the solid line initial positiion to the arbitrarily chosen broken line position in which the toggle arm is vertical, the circular cam 110 has become lowered and has been rotated clockwise about its pivot 111 a few degrees while being maintained in abutment with the oblique face 129 of the push rod 105 thereby holding the push rod in its initial right hand position. Both the tension spring 112 and the compression spring 115 thus far resist the clockwise turning of the cam and both springs operate to maintain the abutment relationship mentioned. The dotted line position of Fig. 11 is shown in solid lines in Fig. 12, and it will be seen by comparing Fig. 4 and Fig. 11 that during this portion of the cycle the cam 110 exerts a positive force on the push rod 105 against the static (inlet) fluid pressure on the plunger 79 which is opposed by equal (inlet) fluid pressure force on the plunger 78.

Figure 12:
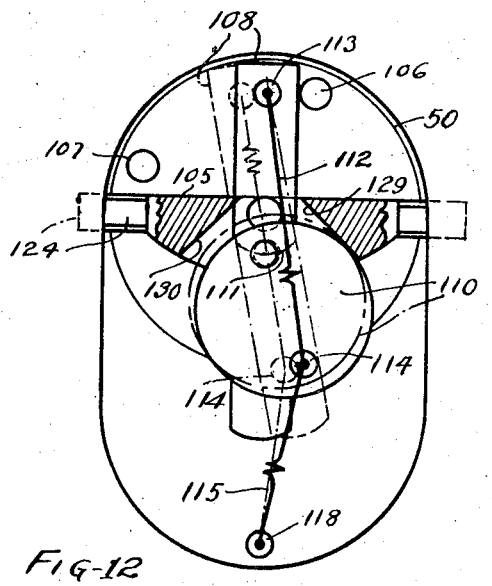
Figure 13:
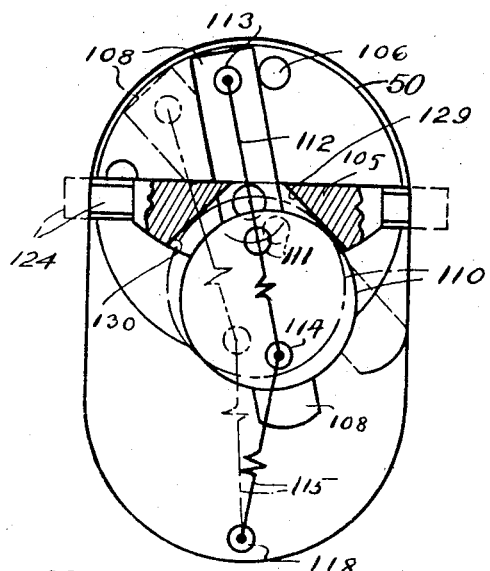
Figure 14:
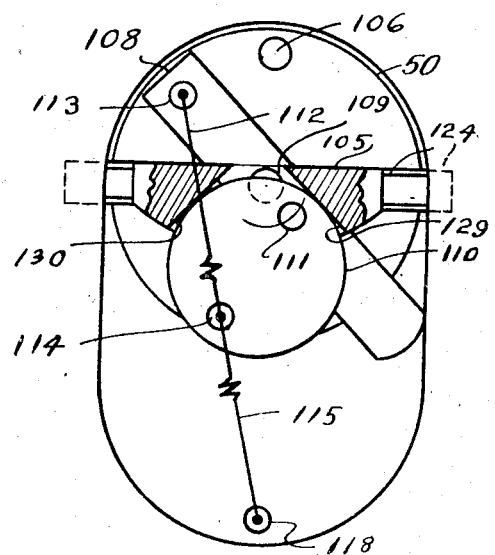

As the pin 106 continues to move counterclockwise, the toggle arm 108 is further rotated from the solid line position of Fig. 12 until the dead center position of the toggle arm and the spring 112 has been reached as shown by broken lines in Fig. 12 and by full lines in Fig. 13. During this movement of the toggle arm 108, the cam 110 rotates a few degrees in a clockwise direction but continues to exert a positive pressure on the oblique surface 129. When the dead center position of the spring 112 is reached, the operation of the spring 112 in maintaining the abutment of the cam 110 with the surface 129 is neutralized, but the compression spring 115 continues to operate to maintain the said abutment relationship and with a reduced effective lever arm as compared to the lever arm obtaining in the full line position of Fig. 12. Slight additional movement of the pin 106 in a counterclockwise direction causes the toggle arm 108 and the spring 112 to pass quickly through their dead center position into the final tripped position of the arm 108 shown by broken lines in Fig. 13 and by full lines in Fig. 14. As soon as the toggle arm moves through its dead center position, the spring 112 tends to pull the cam 110 clockwise about its pivot, but that force is initially resisted by the compression spring 115 until the pin 114 or upper end of the spring 115 is in line with the pivot pin 111 for the cam 110. After that dead center position of the spring 115 has been reached, the spring 112 and the spring 115 turn the cam 110 clockwise away from the surface 129 and against the surface 130 with a hammer blow. The solid lines of Fig. 13 show the position of the spring 112 and the cam 110 at the dead center position and the full lines of Fig. 14 show the mechanism in its final left hand position. If the compression spring 115 is omitted as indicated in Figs. 4 and 5, the operation is exactly the same as above described except that after the dead center position of the toggle arm 108 and the spring 112 (full lines, Fig. 13) has been passed, both the toggle arm 108 and the cam 110 swing together to their final full line position of Fig. 14, the cam under these conditions then delivering a sharp blow against the left hand oblique face 130 of the push rod 105.

For arresting the toggle arm 108 in its two extreme positions shown by solid lines in Figs. 11 and 14, one end of the toggle arm, lower end as shown, abuts one or the other of the parallel side walls of the toggle housing recess 21. Such arresting abutment maintains a predetermined strain in the toggle spring 112 augmenting the hammer blow delivered by the toggle member 110 against the shoulders 129 and 130. The toggle member 110 is arrested in its extreme positions by the push rod 105 through said shoulders after the push rod has been moved to valve reversing position as described below. In the arrested positions of the toggle member 110 (Figs. 11 and 14) the valve actuator rod 105 is blocked by the remaining strain of both toggle springs, against movement in either possible direction.

The hammer blow of the cam 110 against the surface 130 of the push rod 105 quickly moves the plunger 78 to the left to open the ports 92 and to cut off, at the ports 90, the fluid pressure supply from the inlet port 16 to the piston chamber 70. Concurrently, the plunger 79 moves to the left due to the direct connection of the passage 98 with the inlet port 16, and closes the ports 102 and opens the ports 100 so that fluid flows from the passage 98 into the chamber 104 and then through the passage 150 to the right hand piston chamber 71.

High pressure fluid thus introduced into the chamber 71 returns the piston assembly 24 to its initial position; and, during such movement, the rack teeth drive the shaft 22 clockwise as viewed in Fig. 6. Consequently the drive pin 107 engages the toggle arm 108 and returns the latter through its dead center position with a snap action as before. The cam 110 remains in engagement with the surface 130 and holds the push rod 105 in its left hand position until, after the dead center positions have been passed, the cam 110 swings counterclockwise against the surface 129 with a hammer blow to force the push rod 105 to its initial right hand position.

When the piston assembly 24 moves to the right (Fig. 6) fluid in the piston chamber 71 is discharged through the passage 150, the chamber 104, the ports 102, the segmental spaces between the push rod 105 and the guide 76, the toggle-containing recess 21, and the discharge passage 147 to the outlet port 18. Similarly, as the piston assembly 24 moves to the left, fluid in the piston chamber 70 is discharged through the passage 149, the chamber 94, the ports 92, the segmental spaces between the push rod 105 and the guide 76, the recess 21 and the passage 147 to the outlet port 18.

In many instances it is desirable to have a windshield wiper blade sweep through a very small arc prior to each reversal, i. e. to have an extremely short stroke of movement which may be of the order of 35° of arc. The minimum length of wiper blade stroke is determined by the maximum speed of operation of the snap action mechanism, and since in the principal embodiment just described the drive plate of the snap action mechanism is driven at the same speed as the wiper blade shaft, the extremely short strokes sometimes desired cannot be obtained. In the modification of Fig. 8 as well as of Figs. 9 and 10, means are provided to cause the wiper blade shaft to rotate relatively slower than the drive plate of the snap action mechanism. As a result of this differential in speed, the wiper blade shaft travels through a smaller arc relative to the arc of travel of the drive plate in moving from one extreme position to the other.

In Fig. 8 a speed increasing gear train is interposed between the rack driven pinion and the drive plate thereby to cause more rapid rotation of the drive plate relative to the speed of rotation of the wiper blade shaft, whereas in Figs. 9 and 10 a speed reducing gear drive is interposed between the rack driven pinion and the wiper blade shaft.

Referring to Fig. 8, a unitary body structure 160 of a fluid motor 161 houses the piston assembly 24, a valve mechanism which is the same as that of the principal embodiment, and a snap action mechanism 162 which is essentially the same as the mechanism 20. The rack member 52 is in continuous driving engagement with a pinion 164 which is secured on a squared end portion 165 of a power take-off shaft 166 to the outer end of which a windshield wiper drive arm (not shown) may be secured. The shaft 166 is rotatably supported in the bearing assembly 23 which is mounted in a counterbored portion 167 of an opening 168 in the body 160 similar to the opening 30 of Fig. 5. An enlarged intermediate portion of the opening 168 provides a working space 169 for the pinion 164 as well as for a toothed flange portion 170 of the shaft 166 disposed between the pinion 164 and the retainer 41 of the bearing assembly 23. The flange portion 170 constitutes a gear wheel which is in driving engagement with a relatively smaller gear wheel 171 secured, as by the splined connection illustrated, on the inner end portion of a shaft 172 having a relatively larger gear wheel 174 formed integrally at its outer or rearward end. The shaft 172 is rotatably supported by a flanged bushing 175 pressed into a bore or socket 176 formed in the body 160 and opening into a recess 178 containing the snap action mechanism 162. The inner end portion of the socket 176 is enlarged to form a working space 179 for the gear wheel 171, and the gear wheel 174 is disposed within the recess 178.

The gear wheel 174 is in driving engagement with a relatively smaller gear wheel 180 which is secured as by a pin key 181 to a hollow hub portion 182 of a drive plate 184 of the snap action mechanism 162. The hub 182 is rotatably received in a flanged bushing 184' pressed into a reduced extension of the opening 168, and in turn rotatably receives in its axial opening an elongated hub portion 185' of a toggle arm 185. The flange portion of the bushing 184' is rotatably received in a cylindrical opening 186 formed in the rear face of the pinion 164 thereby to form a bearing support for the inner end portion of the shaft 166. Except for the above described features of the drive plate and toggle arm, the snap action mechanism 162 is the same as the mechanism 20.

If desired, transverse thrust on the drive plate 184 may be absorbed by an idler pinion 187 in continuous engagement with the gear wheel 180 diametrically opposite the gear wheel 174. The pinion 187 has its central or hub portion journaled on a cylindrical pin 188 seated in a bore 189 corresponding to the fluid outlet opening 59 in the body 10, a spacer washer 190' being disposed between the base of the recess 178 and the rear face of the pinion 187. An axial opening 190 in the pin 188 serves to permit exhaust of high pressure fluid from the piston chambers corresponding to 70 and 71 of Fig. 6 in event the safety relief balls become unseated.

Operation of the motor 160 is similar to that of the motor of Figs. 1 to 6 except that the drive plate 184 rotates more rapidly with respect to the speed of rotation of the wiper blade shaft 166 due to the interposition of the speed increasing gear train just described. Consequently, for a given angle of rotation of the drive plate 184, the wiper blade shaft 166 turns through a relatively smaller angle than does the shaft 22 during the same angle of movement of the drive plate 50. Thus the angle of stroke of a wiper drive arm driven by the motor 160 can be made smaller than is possible for a wiper drive arm driven by the motor of Figs. 1 to 6.

In the modification shown by Figs. 9 and 10, a fluid motor 200 has a lower main body portion 201 and an upper body portion 202 secured together as by a plurality of cap screws 204, a gasket 205 being received within a shouldered recess at an opening 206 in the bottom wall of the body 202 to provide an oil-tight seal at the joint between the two body portions. The body portion 201 has a recess 208 containing the snap action mechanism 20 and also contains the valve mechanism and the piston assembly 24. The body portion 202 has a cylindrical opening 209 intersecting the opening 206 and provided with a threaded counterbore 210. An opening 211 in the top wall of the body portion 201 is aligned with the opening 206 and intersects a longitudinal opening 212 in the body 201 which, in turn, intersects a piston bore 214 corresponding to the bore 63 of the principal embodiment.

The rack member 52 of the piston assembly 24 is in direct driving engagement with a pinion 215 disposed within the opening 212 and mounted on an intermediate non-circular portion 216 of a shaft 218. The outer or forward end portion of the shaft 218 is rotatably supported in a bushing 219' pressed into a socket 220 formed in the inner face of a sealing plug 221 threaded into the opening 212. An elastic ring packing 222 is received in an annular groove formed in the plug 221 and engages the first few threads of the opening 212 as the plug is screwed into position. The shaft 218 has a flange portion 224 disposed between the opposing faces of the bushing 219' and the pinion 215 to absorb axial thrust on the shaft and is provided with a splined or longitudinally serrated inner or rear end portion 225 received within the complementary grooved hub portion 49 of the drive plate 50. The hub 49 is rotatably supported by the flanged bushing 51 which is pressed into a reduced extension of the opening 212.

The pinion 215 is in continuous driving engagement with a segmental gear 219 mounted on an intermediate squared portion 226 of a power take-off or wiper arm shaft 228 rotatably disposed within the opening 209 of the body portion 202, clearance for the gear 219 being provided by the aligned openings 206 and 211. The inner end portion of the shaft 228 is rotatably supported by a bushing 229 pressed into a reduced portion of the opening 209 and an intermediate portion of the shaft is supported by a bushing 230. The bushing 230 has an enlarged inner end portion 231 pressed into the opening 209 and an adjacent flange portion 232 abutting the bottom of the counterbore 210. A collar 234 threaded into the counterbore 210 loosely surrounds the bushing 230 and compresses an elastic ring packing 233 against the flange 232. The inner end portion of the bushing 230 is counterbored to receive a ring packing 235 having a generally C-shaped cross section and bearing against the shaft 228. Axial thrust of the shaft 228 is absorbed by an integral flange 236 disposed between the inner end face of the bushing 230 and the gear 219.

The operation of the motor 200 is the same as that of the principal embodiment except that the relative size of the pinion 215 and gear 219 causes the wiper drive shaft 228 to move relatively slower than the drive plate 50 whereby extremely short stroke movement of a wiper blade may be obtained and at increased torque without increase in motor size. The arrangement according to Fig. 10 has an advantage over that of Fig. 8 in that there is less power transmission loss in obtaining short stroke operation by the Fig. 10 construction.

I claim:

1. In a fluid operated motor, a power member moved in opposite directions in response to reversal of supply and exhaust fluid, a reversing valve and actuator member therefor, a snap action mechanism comprising a pivoted toggle arm swingable in opposite directions about a fixed pivot, means operatively connecting the power member and arm to swing the arm in said directions, a cooperating toggle member pivotally mounted on the toggle arm eccentric to said fixed pivot and means including a spring connected between the toggle members and movable through a dead center position, the toggle member having alternately operating percussion abutment connections with the valve actuator member reversibly to move the latter, and a pair of abutments positioned to arrest the toggle arm in opposite extreme positions prior to occurrence of each percussion abutment connection while maintaining strain in said spring.

2. In a fluid operated motor, a power member moved in opposite directions in response to reversal of supply and exhaust fluid, a reversing valve and actuator member therefor movable oppositely to valving positions, a snap action mechanism comprising a toggle arm swingable in opposite directions about a fixed supporting pivot, means operatively connecting the power member and arm to swing the arm in said directions, a cooperating toggle member pivoted to said arm and arranged to swing reversibly into operating abutment with the actuator member, a spring connected between the toggle arm and toggle member remotely of the supporting pivots thereof, said spring being movable through a dead center position during operation of the snap action mechanism, said toggle member being swingable about its pivot on said arm from abutment with the actuator member in one direction out of abutment therewith and into opposite percussion operating abutment with the actuator member, and a pair of abutments for arresting said toggle arm in opposite positions while maintaining strain in said spring.

3. In a fluid operated motor, a power member moved in opposite directions in response to reversal of supply and exhaust fluid, a reversing valve mechanism for controlling supply and exhaust fluid, an actuator member therefor movable in opposite directions and having a pair of oppositely facing spaced abutment, a snap action toggle mechanism connected for operation by the power member and comprising a toggle arm, a toggle member, and a spring connecting said arm and member, said spring operating to hold the toggle member alternately against said abutments while the toggle arm is being moved in respective directions past the dead center position of the spring, said toggle member then engaging both abutments of the actuator member in a manner tending to retain the latter against movement in either direction.

4. In a fluid operated motor, a cylinder and a piston reciprocatable therein, a rotary part oscillated by the piston, reversing valve means for diverting operating fluid alternately to opposite ends of the cylinder, a reciprocatable actuating member operatively connected to the valve means, said actuating member having spaced shoulders, an arm operatively associated with said rotary part, means pivotally supporting the arm for oscillation by said rotary part, a cam constituting a toggle member pivoted to the arm eccentrically of the pivot of the arm and additionally connected to the arm by a snap action spring movable across a dead center position with reference to the arm and pivot axis of the cam, said cam having arcuate surfaces operative with a sliding action against said shoulders, said spring acting to hold the cam against respective shoulders while the arm is moved considerably more than half its total oscillating movement to dead center position and the spring then acting to move the cam quickly out of engagement with one shoulder and into engagement with the other.

5. In a fluid operated motor, a cylinder and a piston reciprocatable therein, a rotary part oscillated by the piston, reversing valve means for diverting operating fluid alternately to opposite ends of the cylinder, a reciprocatable actuating member operatively connected to the valve means, said actuating member having spaced divergent shoulders, an arm pivotally supported for oscillation by said rotary part, a cam in the form of a circular disc constituting a toggle member and pivoted to the arm eccentrically of the periphery of the disc and eccentrically of the pivot of the arm and additionally connected to the arm by a snap action spring movable across a dead center position with reference to the arm and said pivots, said cam being operative against respective shoulders continuously until the arm, cam and spring are moved past dead center positions.

6. In a fluid operated motor, a reciprocating fluid operable power member and reversing valve means operated thereby to divert fluid alternately into operative contact with the power member, a valve actuating mechanism comprising an oscillating arm driven by the power member and a toggle member pivotally connected to the arm and additionally connected therewith by a snap action spring which assumes a dead center position when the arm and toggle member are in one relative position, and a compression spring having a stationary pivoted support at one end and a support carried by the toggle member at the other end.

7. In a fluid operated motor, a cylinder and a piston reciprocatable therein, a rotary part oscillated by the piston, reversing valve means for diverting operating fluid alternately to opposite ends of the cylinder, a reciprocatable actuating member operatively connected to the valve means, said actuating member having spaced shoulders, an arm pivotally supported for oscillation by said rotary part, a cam constituting a toggle member pivoted to the arm eccentrically of the pivotal support of the arm and additionally connected thereto by a snap action spring movable across a dead center position with reference to the arm and cam, said cam having arcuate surfaces eccentric to the pivot axis of the cam on the arm and operative against said shoulders alternately, a compression spring having a stationary pivoted support at one end and a support carried by said cam remotely of the cam pivot at the other end, said springs acting on the cam to rotate it in opposite directions about the pivot axis of the cam from one extreme position engaging one shoulder quickly through an intermediate position into engagement with the other shoulder.

8. In a fluid operated motor, a reciprocating fluid operable power member and reversing valve means operated thereby to divert fluid alternately into operative contact with the power member, a valve actuating mechanism comprising an oscillating arm driven by the power member and a toggle member pivotally connected to the arm and additionally connected therewith by a snap action compression spring which assumes a dead center position when the arm and toggle member are in one relative position, and a second compression spring having a stationary pivoted support at one end and a support carried by the toggle member at the other end.

9. In a fluid operated motor, a reciprocating fluid operable power member and reversing valve means operated thereby to divert fluid alternately into operative contact with the power member, a valve actuating mechanism comprising an oscillating arm driven by the power member and a toggle member pivotally connected to the arm and additionally connected therewith by a snap action spring which assumes a dead center position when the arm and toggle member are in one relative position, and a compression spring having a stationary pivoted support at one end and a pivotal support on the toggle member at the other end concentric with the connection of the first spring with the toggle member, whereby the compression spring acts on the toggle member in the same general direction as the snap action spring acts thereon.

10. In a fluid operated motor, a reciprocating fluid operable power member and reversing valve means operated thereby to divert fluid alternately into operative contact with the power member, a valve actuating mechanism comprising an oscillating arm driven by the power member and a toggle member pivotally connected to the arm and additionally connected therewith by a snap action spring which assumes a dead center position when the arm and toggle member are in one relative position, and a compression spring having a stationary pivoted support at one end and a pivotal connection with the toggle member at the other end concentric with the point of connection of the snap action spring therewith and acting on the toggle member in the same general direction as the snap action spring acts thereon.

11. In a fluid operated motor, a reciprocating piston drivingly connected to a rotatable power take-off shaft, reversing valve mechanism for controlling the operation of said piston, an actuator mechanism for said valve mechanism, said actuator mechanism being movable in opposite directions through a dead center position with a snap action, circumferentially spaced abutments rotatable about a common axis and driven by said piston for effecting operation of said actuator mechanism, and means interposed between said piston and said abutments for causing said abutments to rotate at a different speed from that of said power take-off shaft.

12. In a fluid operated motor, a reciprocating piston drivingly connected to a rotatable power take-off shaft, reversing valve mechanism for controlling the operation of said piston, an actuator mechanism for said valve mechanism, said actuator mechanism being movable in opposite directions through a dead center position with a snap action, circumferentially spaced abutments rotatable about a common axis and driven by said piston for effecting operation of said actuator mechanism, and gear means driven by said piston and operating to cause said power take-off shaft to rotate more slowly than said abutments.

13. In a fluid operated motor, a reciprocating piston drivingly connected to a rotatable power take-off shaft, aligned duplex sliding valve plungers and cooperating valve means for controlling the operation of said piston, an actuator mechanism for said valve plungers, said mechanism being driven in opposite directions through a dead center position with a snap action, circumferentially spaced abutments rotatable for effecting operation of said actuator mechanism, and a gear train interposed between said shaft and said abutments for rotating said abutments more slowly than said shaft.

14. In a fluid operated motor, a reciprocating piston drivingly connected to a rotatable power take-off shaft, reversing valve mechanism for controlling the operation of said piston, an actuator mechanism for said valve plungers, said actuator mechanism being movable in opposite directions through a dead center position with a snap action, circumferentially spaced abutments rotatable about a common axis and driven by said piston for effecting operation of said actuator mechanism, and means interposed between said piston and said power take-off shaft for causing said shaft to rotate at a different speed from that of said abutments.

15. A fluid operated motor comprising a body formed with a pair of pressure chambers and a reciprocatable power member cooperating therewith for operation in opposite directions by fluid admitted alternately to and exhausted from said chambers, reversing valve mechanism in said body arranged for alternately supplying and exhausting fluid to and from the chambers, snap action toggle mechanism between the power member and valve means and located in a recess in said body, a cover for the recess, and a wear resisting plate carried by the cover positioned for sliding, position-retaining engagement with a portion of the toggle mechanism.

16. A fluid operated motor comprising a body having a cylinder and reciprocatable piston therein, a pair of valve chambers aligned on an axis parallel to said cylinder, a pair of fluid ports on an axis parallel to said cylinder, an inlet passage axially aligned with one of said ports and terminating substantially at the central axis of said body, a pair of divergent passages extending from the terminus of said inlet passage to said valve chambers respectively, and a pair of divergent passages extending from said valve chambers respectively to opposite ends of said cylinder.

COLUMBUS R. SACCHINI.

REFERENCES CITED

The following references are of record in the file of this patent:

UNITED STATES PATENTS

| Number | Name | Date |
| --- | --- | --- |
| 294,807 | Reese | Mar. 11, 1884 |
| 1,567,328 | Oishei | Dec. 29, 1925 |
| 1,910,019 | Kelly | May 23, 1933 |
| 2,229,641 | Darling | Jan. 28, 1941 |